United States Patent
Jacob (10) Patent No.: US 10,614,147 B2
(45) Date of Patent: Apr. 7, 2020

(54) EMBEDDED SYSTEM, METHOD AND COMMUNICATION UNIT FOR IMPLEMENTING A FAST FOURIER TRANSFORM USING CUSTOMIZED INSTRUCTIONS

(71) Applicant: NXP B.V., Eindhoven (NL)

(72) Inventor: Naveen Jacob, Bangalore (IN)

(73) Assignee: NXP B.V., Eindhoven (NL)

( * ) Notice: Subject to any disclaimer, the term of this patent is extended or adjusted under 35 U.S.C. 154(b) by 107 days.

(21) Appl. No.: 15/904,284

(22) Filed: Feb. 23, 2018

(65) Prior Publication Data
US 2018/0253400 A1    Sep. 6, 2018

(51) Int. Cl.
*G06F 17/14*    (2006.01)
*H04L 27/26*    (2006.01)
*G06F 17/16*    (2006.01)

(52) U.S. Cl.
CPC .......... *G06F 17/142* (2013.01); *G06F 17/141* (2013.01); *G06F 17/16* (2013.01); *H04L 27/263* (2013.01); *G06F 17/144* (2013.01)

(58) Field of Classification Search
CPC . H04L 27/263; H04L 27/265; H04L 27/2666; G06F 17/141; G06F 17/142; G06F 17/144; G06F 17/147; G06F 17/16
USPC ........ 375/260, 261, 262, 265, 267; 370/208, 370/210
See application file for complete search history.

(56) References Cited

U.S. PATENT DOCUMENTS

| | | | |
|---|---|---|---|
| 6,609,140 B1 | 8/2003 | Greene | |
| 7,499,509 B2 | 3/2009 | Zhidkov | |
| 7,702,713 B2 | 4/2010 | Goswami et al. | |
| 8,990,281 B2* | 3/2015 | Derby ................... | G06F 17/142 708/404 |
| 2002/0025011 A1 | 2/2002 | Sullivan | |
| 2007/0009061 A1 | 1/2007 | Kaku et al. | |
| 2010/0088356 A1* | 4/2010 | Lloyd ................... | G06F 17/142 708/404 |
| 2010/0106758 A1* | 4/2010 | Govindaraju ......... | G06F 17/142 708/404 |

(Continued)

OTHER PUBLICATIONS

Van de Burgwal, M. et al. "Non-Power-of-Two FFTs: Exploring the Flexibility of theMontium TP", 13 pg., retrieved from the Internet at: https://www.researchgate.net/publication/38107258_Non-Power-of Two_FFTs_Exploring_the_Flexibility_of the_Montium_TP, (Dec. 4, 2008).

(Continued)

*Primary Examiner* — Young T Tse
(74) *Attorney, Agent, or Firm* — Rajeev Madnawat (57) ABSTRACT

An embedded system is described. The embedded system includes a processing circuit comprising 'Q' processing units that can be operated in parallel. A memory is operably coupled to the processing circuit and includes at least input data. The processing circuit is configured to support an implementation of a non-power-of-2 fast Fourier transform of length N using a multiplication of at least two smaller FFTs of a respective first length N1 and second length N2, where N1 and N2 are whole numbers. The processing circuit is further configured to employ a customized instruction configured to perform an FFT operation of length less than 'Q' using a first of the at least two smaller FFTs.

14 Claims, 4 Drawing Sheets

(56) References Cited

U.S. PATENT DOCUMENTS

| | | |
|---|---|---|
| 2010/0149963 A1 | 6/2010 | Bae et al. |
| 2010/0150217 A1 | 6/2010 | Jwa et al. |
| 2011/0099216 A1* | 4/2011 | Sun .................. G06F 17/142 |
| | | 708/404 |
| 2018/0253399 A1 | 9/2018 | Jacob |

OTHER PUBLICATIONS

Blake, A. "Computing the fast Fourier transform on SIMD microprocessors", 2 pgs., retrieved from the Internet on Sep. 21, 2017 at: https://cnx.org/exports/8364463c-d5e7-4617-b892-fc2b38f60a59%402.2.pdf/computing-the-fast-fourier-ransform-on-simdmicroprocessors (Jul. 16, 2012).

Cypher, R. et al. "The SIMD Model of ParallelComputation", Springer Verlag, USA, 3 pgs. (Jan. 1, 1994).

Wyrzykowski, R. et al. "Parallel Processing and Applied Mathematics", Springer, Germany, 3, pgs. (Jan. 1, 208).

Pingali. K. et al. "Languages and Compilers for parallel Computing", Springer, Germany, 4 pgs. (Jan. 1, 1995).

Sabot, G. "Optimized CM Fortran compiler for the Connection Machine computer", Proceedings of the Twenty-Fifth Hawaii International Conference on System Sciences, Kauai, HI, pp. 161-172, vol. 2 (1992).

Final Rejection for U.S. Appl. No. 15/904,066, 11 pgs, (dated May 8, 2019).

Notice of Allowance for U.S. Appl. No. 15/904,066, 8 pgs, (dated Jun. 7, 2019).

Office Action for related U.S. Appl. No. 15/904,066, 15 pgs., (dated Apr. 5, 2019).

\* cited by examiner

EMBEDDED SYSTEM, METHOD AND COMMUNICATION UNIT FOR IMPLEMENTING A FAST FOURIER TRANSFORM USING CUSTOMIZED INSTRUCTIONS

CROSS-REFERENCE TO RELATED APPLICATIONS

This application claims the priority under 35 U.S.C. § 119 of European Patent application no. 17159165.4, filed on Mar. 3, 2017, the contents of which are incorporated by reference herein.

FIELD OF THE INVENTION

The field of the invention relates to an embedded system, a communication unit, and method for implementing Fast Fourier Transforms (FFTs). The invention is applicable to, but not limited to, a method for implementing an FFT or Inverse FFT with lengths that are not a power-of-2 and the FFT (when decomposed) does not yield a multiple-of-Q FFT.

BACKGROUND OF THE INVENTION

One of the challenges in implementing a Digital Radio Mondiale (DRM) application in a communication unit is the implementation of a Fast Fourier Transform (FFT) algorithm and/or an Inverse Fast Fourier Transform (IFFT) algorithm that are required in the baseband processing of an orthogonal frequency division multiplexed (OFDM) receiver. This is a challenging task as several of the supported FFT lengths are not a 'power-of-two', and the FFT when decomposed does not yield a multiple-of-2 FFT. Therefore, in these cases, a non-standard implementation approach to FFTs needs to be adopted. Table 1 below provides some examples of the FFT lengths that need to be supported with different DRM transmission modes.

TABLE 1

| DRM transmission mode | FFT length |
| --- | --- |
| A | 576 |
| B | 512 |
| C | 352 |
| D | 224 |
| E | 432 |

It is known that implementation of FFT lengths of the power-of-2 are easily realizable and typically exist in a form of libraries supplied by a vendor of a digital signal processor (DSP) that supports FFT and/or IFFT functionality. However, some of the DRM required FFT lengths in Table 1 are not of the power-of-2, and also not available as libraries. Therefore, an efficient realization of a FFT implementation on a DSP requires special techniques to exploit the best utilization of a given processor architecture.

The FFT is a faster implementation of a Discrete Fourier Transform (DFT), whose equation can be defined as a sequence of N complex numbers x0, x1, . . . xN−1 that is of the form of [1]:

$$X_k \stackrel{\text{def}}{=} \sum_{n=0}^{N-1} x_n \cdot e^{-2\pi i k n/N}, \quad k \in \mathbb{Z} \text{ (integers)} \quad [1]$$

The DFT computes frequency values (namely $X_k$) in a given input time domain sequence (namely $x_n$), and the term $e^{-2\pi i k n/N}$ used in the equation [1] is referred to as twiddle-factors. A twiddle factor, in FFT algorithms, is any of the trigonometric constant coefficients that are multiplied by the data in the course of the algorithm. It is known that the FFT efficiently implements the DFT, by exploiting symmetry in its twiddle factors.

A well-known FFT algorithm is the "divide and conquer" approach proposed by Cooley-Tukey in 'J. W. Cooley and J. W. Tukey, "An algorithm for the machine calculation of complex Fourier series," Mathematics of computation, vol. 19, pp. 297-301, April 1965'. This method is used for FFTs that have a length that is a power of the radix (e.g., two for radix-2). If other lengths are required, a mixed-radix algorithm can be used. For example an FFT-288 can be re-expressed with a radix-2 and radix-3 FFT (e.g. the 288-point FFT can be decomposed to FFT-32×FFT-9). A further more-efficient approach was introduced by Good in 'I. J. Good, "The Interaction Algorithm and Practical Fourier Analysis", Journal of the Royal Statistical Society. Series B (Methodological) Vol. 20, No. 2 (1958), pp. 361-372' in order to eliminate the intermediate multiplications required in the Cooley-Tukey approach. This algorithm is sometimes known as the Prime Factor Algorithm (PFA).

It is known that non-power-of-two FFTs can be generalized to a group of 2-dimensional PFA-decomposable DFTs of the form of equation [2]:

$$N = N_1 \cdot N_2 = (2p+1) \cdot 2^q. \quad [2]$$

Table 2 provides an overview of a selection of the FFTs that can be generated with parameters 'p' and 'q' of the PFA equation [2], with those required for DRM depicted as underlined.

TABLE 2

| | q | | | |
| --- | --- | --- | --- | --- |
| p | 4 | 5 | 6 | 7 |
| 2 | 80 | 160 | 320 | 640 |
| 3 | <u>112</u> | <u>224</u> | 448 | 896 |
| 4 | 144 | <u>288</u> | <u>576</u> | 1152 |
| 5 | <u>176</u> | <u>352</u> | 704 | 1408 |
| 6 | 208 | 416 | 832 | 1664 |
| 7 | 240 | 480 | 960 | <u>1920</u> |

Figure 1:
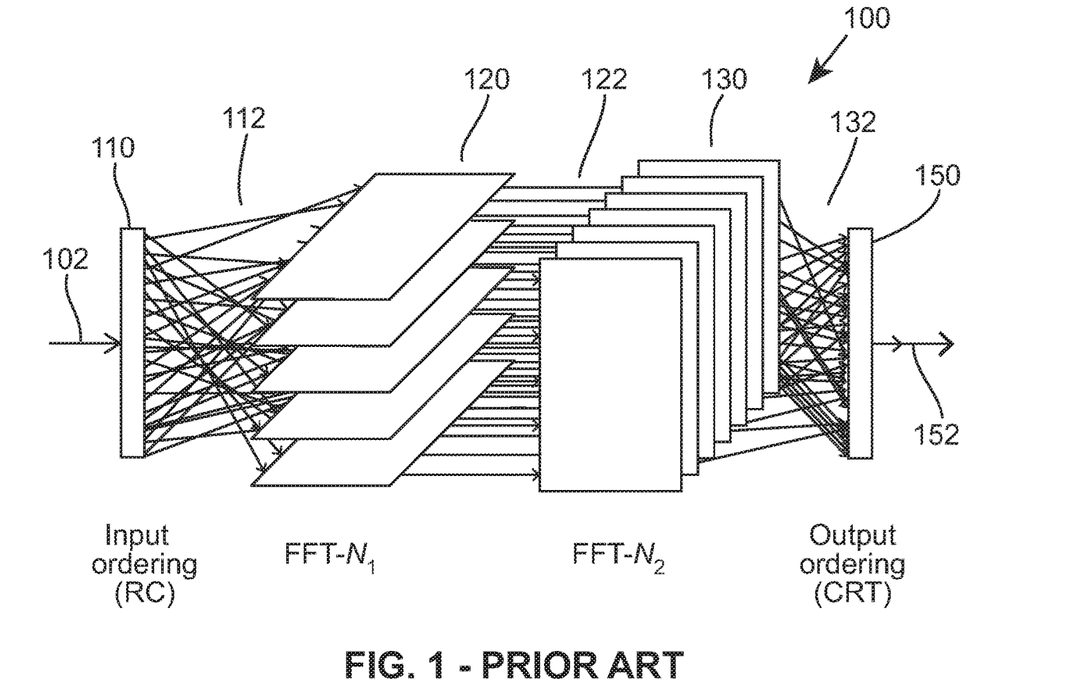
FIG. 1 illustrates a simplified arrangement of a known PFA decomposed FFT.

For DRM software to have a good performance in terms of the FFT computation time, memory, and power, an efficient non-power-of-two FFT implementation is required. Known reconfigurable co-processors have been developed to support non-power-of-two FFT realizations, as illustrated in FIG. 1 with the simplified arrangement 100 of a known PFA decomposed FFT. This FFT algorithm recursively re-expresses a DFT of length N=N1×N2, into smaller DFTs of size N1 120 and N2 130. The lengths of the small DFTs N1 120 and N2 130 have to be co-prime and can be implemented with an arbitrary algorithm. Good's mapping in equation [2] is used to convert N=N1×N2× . . . ×NL point DFT into a L-dimensional DFT equation and optimizes the PFA for the number of calculations to be performed. However, Good's mapping in equation [2] assumes that the input data 102 is ordered in Ruritanian Correspondence (RC) order by RC function 110, and output data in Chinese Remainder Theorem (CRT) order by CRT function 150, or vice versa. Thus, the simplified arrangement 100 routes 112 the respective ordered data bits to a first N-point DFT 120 of size N1 and thereafter a second N-point DFT 130 of size N2, before the output data 152 is reordered by CRT function 150.

However, for many applications, such as an application that is required to support the five DRM transmission modes, use of a co-processor to solely implement a FFT function, and support non-power of 2 FFT computations and the FFT when decomposed that does not yield a multiple-of-2 FFT, adds an undesirable increase in cost of the solution.

Implementations of FFTs of length 576, 512, and 432 are available as libraries from the vendors of processors. However, the DRM FFT lengths of 352 and 224 are not available as third party libraries. Hence, a solution is needed to implement (at least for a DRM solution) the FFT 352 and FFT 224, for example optimized for a particular single instruction, multiple data (SIMD) vector processor. A vector processor, or array processor, is a central processing unit (CPU) that implements an instruction set containing instructions that operate on one-dimensional arrays of data called vectors. Here, each element of the vector feeds a single unique processing element, or the processing elements are lined up in a vector form to operate on the vector data. This arrangement is in contrast to a scalar processor, whose instructions operate on single data items.

Figure 2:
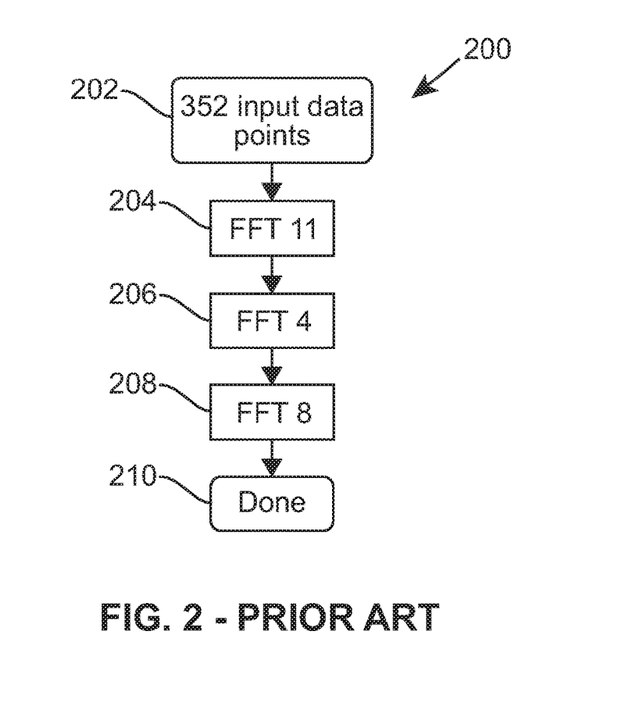
FIG. 2 illustrates a flowchart of a known operation for implementing a regular 352-point FFT using a PFA decomposed FFT on a DSP.

Referring now to FIG. 2 a flowchart 200 illustrates a known operation for implementing a regular 352-point FFT using a PFA decomposed FFT on a DSP. Here, using a PFA decomposed FFT on a DSP, the FFT 352 can be decomposed into smaller FFTs, namely: FFT 11×FFT 4×FFT 8, where N1=11, N2=4, N3=8, and where the implementation of FFT4 and FFT8 is readily achievable. However, the FFT designer is required to devise techniques for deriving the best use of the processor or processing elements in order to implement the FFT11 operation. The flowchart 200 commences in step 202 with input data of 352 data points. At a first stage in 204, 32 instances of 11-point FFT are computed as [3]:

$$FFT11a(k)=FFT11(x(32n+a)) \quad [3]$$

Where: a is the instance number=0, 1, . . . , 31;
n=0, 1, . . . , 10 to generate the 11 Input values;
k=0, 1, . . . , 10 to generate the 11 output values.

The output of FFT11 is processed by FFT4 in a second stage in 206, and, for a given FFT11, each of the 11 outputs goes to a different FFT4 module, as illustrated in FIG. 1. Thus, the second stage in 206 contains 88 instances of the 4-point FFT, which are computed as [4]:

$$FFT4b(l)=FFT4(FFT11a(b),FFT11a+8(b)*tw0(b),$$
$$FFT11a+16(b)*tw1(b),FFT11a+24(b)*tw2(b)) \quad [4]$$

Where: b is the instance number=0, 1, . . . , 87;
a is used on computation of the instance number of FFT11;
a=0, 1, . . . , 7;
l=0, 1, . . . , 3 generates the 4 output values; and
tw0(b), tw1(b), and tw2(b) are twiddle factors for 'b' th instance of FFT4 in 206, as illustrated in [5], [6], [7].

$$FFT4b(l)=FFT4(FFT110(k),FFT118(k)tw0(b),$$
$$FFT1116(k)*tw1(b),FFT1124(k)*tw2(b)) \quad [5]$$

for k=0, 1, . . . 10; and for b=0, 1, . . . , 10

$$FFT4b(l)=FFT4(FFT111(k),FFT119(k)*tw0(b),$$
$$FFT1117(k)*tw1(b),FFT1125(k)*tw2(b)) \quad [6]$$

for k=0, 1, . . . , 10; and for b=11, 12, . . . , 21

$$FFT4b(l)=FFT4(FFT117(k),FFT115(k)*tw0(b),$$
$$FFT1123(k)*tw1(b),FFT1131(k)*tw2(b)) \quad [7]$$

for k=0, 1, . . . , 10; and for b=77, 78, . . . , 87

The flowchart 200 then comprises a third stage in 208 that consists of 44 instances of 8-point FFT that are computed as in [8]:

$$FFT8c(m)=FFT8(FFT4a(b),FFT4a+12(b)tw0(c),$$
$$FFT4a+24(b)tw1(c),FFT4a+36(b)*tw2(c),$$
$$FFT4a+48(b)*tw3(c),FFT4a+60(b)tw4(c),$$
$$FFT4a+72(b)*tw5(c),FFT4a+84(b)*tw6(c),) \quad [8]$$

Where:
c is the instance number=0, 1, . . . , 43;
a is used on computation of the instance number of FFT4;
b=0, 1, . . . , 3;
m=0, 1, . . . , 7 to generate the 8 output values; and
tw0(c), tw1(c), tw2(c), tw3(c), tw4(c), tw5(c) and tw6(c) are twiddle factors for 'c' th instance of FFT8.

The output of the third stage at 208, when re-arranged, generates the overall FFT output at 210. However, the inventor of the present invention has recognised and appreciated that such a known approach will not provide an optimal implementation, primarily because the fetching and processing of data will not be done in multiples of 'Y' data points, e.g. fetching and processing in multiples of '4 data points in the above FFT 352 scenario where the vector processor under consideration had 4 parallel multiplier units, which would significantly ease the complexity and speed of FFT processing.

Thus, an efficient DSP implementation is desired for an embedded system, and/or a communication unit, together with methods for implementing FFTs that support non-power of 2 FFT computations and where FFTs of a particular length are not available as libraries from the processor vendor.

SUMMARY OF THE INVENTION

The present invention provides an embedded system, a communication unit and an FFT method therefor, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Although examples of the invention are described with reference to computation of a FFT. It is envisaged that in other examples, the circuits and concepts herein described may be equally applied to the computation of an inverse FFT (FFT) due to the similarity of the computations. Hence, it is envisaged that any reference to FFT hereafter encompasses an IFFT implementation.

Although examples of the invention are described with reference to a Digital Radio Mondiale (DRM) application in a communication unit, it is envisaged that, in other examples, the circuits and concepts herein described may be equally applied, in general, to any embedded systems. Furthermore, it is envisaged that examples of the invention are not limited to a software defined radio as described, but that the non-power-of-2 FFT lengths concepts may find equal applicability in any audio, video, radar, or other communication/entertainment systems. Examples of the invention are also described with reference to a method for implementing an FFT or Inverse FFT with lengths that are not a power-of-2 and the FFT (when decomposed) does not yield a multiple-of-Q FFT.

Examples of the invention are described with reference to a non-power-of-two FFT implementation in a single instruction, multiple data (SIMD) vector processor, which is a class of parallel computers with multiple processing elements that perform the same operation on multiple data points simultaneously. However, it is envisaged that in other examples, the circuits and concepts herein described may be equally applied to other processors that operate with multiple processing elements. Examples of the invention provide solutions for a non-power-of-two FFT implementation with an improved instruction/instruction set.

Examples of the present invention provide a method of performing a FFT operation, an embedded system and a communication unit that include: a processing circuit comprising 'Q' processing units that can be operated in parallel. The processing circuit is configured to support an implementation of a non-power-of-2 fast Fourier transform (FFT) of length N using a multiplication of at least two smaller FFTs of a respective first length N1 and second length N2, where N1 and N2 are whole numbers. A memory is operably coupled to the processing circuit and stores at least input data. The processing circuit is configured to: employ a customized instruction configured to perform an FFT operation of length less than 'Q' using a first of the at least two smaller FFTs, whereby the customized instruction writes results of the performed FFT on to memory in multiples of less than 'Q' data points; and perform a FFT using the second of the at least two smaller FFTs.

In this manner, an embedded system, and/or a communication unit and method are described whereby a FFT architecture is able to support non-power-of-2 FFT computations, and where decomposed FFTs are of a non-multiple-of-2 length and the particular length is not available as libraries from the processor vendor.

In some examples, the customized instruction may be configured to write results of the performed FFT on to memory in multiples of less than 'Q' data points by bypassing a subset of the processing circuit operations. In some examples, the customized instruction may be configured to bypass a subset of the processing circuit operations for every Nth data point. In some examples, the customized instruction may be configured to bypass a subset of the processing circuit operations by fetching data and zeroing out the fetched data at pre-determined data points, e.g. at least at every Nth data point. In some examples, the customized instruction may be employed for use in each of the at least two smaller FFTs of a respective first length N1 and second length N2.

In some examples, in a SIMD processor, when employing, say, four multipliers operating in parallel; examples of the invention propose a use of an instruction to turn-off the $4^{th}$ multiplier. In this manner, such a tuning 'off' of the $4^{th}$ multiplier will have the same effect as a multiplication by zero. Thus, in this manner, a bypassing of a 'subset' of the 'multipliers' or 'processing elements', instead of using the full set, may be employed.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 3:
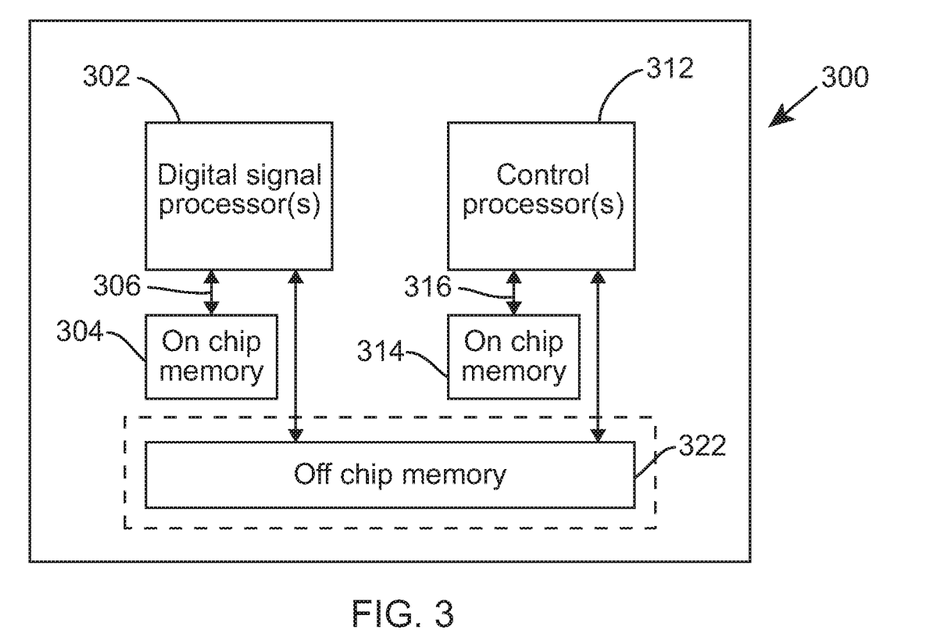
FIG. 3 illustrates an example of a block diagram of a communication unit, which in the illustrated example includes a software radio receiver and/or transmitter arrangement, according to example embodiments of the invention.

Referring first to FIG. 3, a simplified example of a block diagram of a communication unit 300 is illustrated, which includes a software communication receiver and/or transmitter arrangement, according to example embodiments of the invention. The example communication unit 300 includes a Digital Signal Processor (DSP) circuit 302 coupled via bus 306 to on-chip memory 304. The example communication unit 300 also includes one or more Control Processor circuit(s) 312 coupled via bus 316 to further on-chip memory 314. In some examples, off-chip memory 322 may also be connected to the DSP circuit 302 and/or the one or more Control Processor circuit(s) 312.

In this example, the DSP circuit 302 may include one or more DSPs and be configured to contain the software and specialized functional units (hardware) to realize a FFT algorithm. However, in other examples, the DSP circuit 302 may be replaced by the, or a further, control processor 312 that is configured to implement the FFT algorithm, for example in accordance with FIG. 5 or FIG. 6. For an efficient realization of the FFT algorithm, and in this example, the input data and other associated data (for example twiddle factors) may be loaded in the on-chip memory 304, 314 to provide the fastest access by the respective processor 302, 312.

A skilled artisan will appreciate that the level of integration of receiver circuits or components may be, in some instances, implementation-dependent. Furthermore, a signal processor in the transmit chain of communication unit 300 may be implemented as distinct from a signal processor in the receive chain. Alternatively, a single processor, such as DSP 302 in FIG. 3, may be used to implement a processing of both transmit and receive signals. Clearly, the various components within the communication unit 300 can be realized in discrete or integrated component form, with an ultimate structure therefore being an application-specific or design selection and that other components, circuits and functions of a typical communication unit (such as radio frequency amplification, generation, filtering, etc. components and circuits) are not shown for clarity purposes only.

Figure 4:
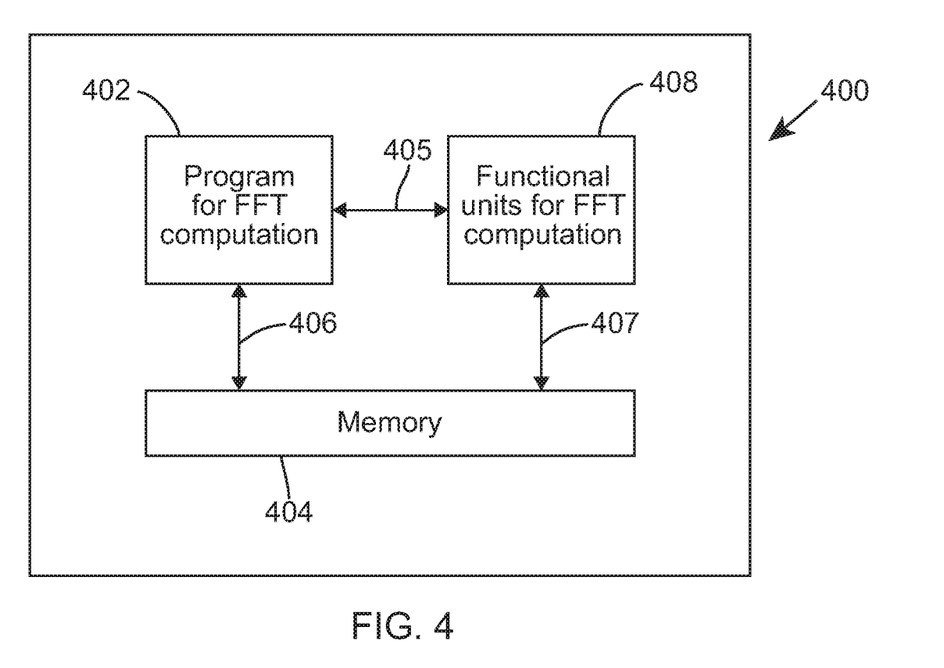
FIG. 4 illustrates an example of a block diagram of an embedded system that includes a processor and is configured to support an implementation of a non-power-of-2 FFT, according to example embodiments of the invention.

FIG. 4 illustrates an example of a block diagram of an embedded system that includes a processor 400 and is configured to support an implementation of a non-power-of-2 FFT, and the FFT when decomposed does not yield a multiple-of-Q (such as a multiple-of-2) FFT, according to example embodiments of the invention. In some examples, the processor in the embedded system may be implemented in a communication unit, and be configured to support an implementation of a non-power-of-2 FFT using the DSP circuit 302 or one or more Control Processor circuit(s) 312 of FIG. 3, according to example embodiments of the invention. In processor 400, an example software program 402 is configured to realize the FFT computation of a given length for the data fetched from the memory 404, such as on-chip memory 304, 314 of FIG. 3 via respective buses 406, 407. In some examples, the example software program 402 may be a general software program that can be run on a processor or an optimized routine written in the language/instruction(s) specific to the digital signal processor. In some examples, the example software program 402 may be implemented in firmware. In examples of the invention, the example software program 402 is configured to provide an efficient implementation of FFT for lengths that are not directly related to an order of a power-of-2 (where power-of-2 means FFTs of length 4, 8, 16, 32, 64, 128, 256, 512, 1024, etc.).

The FFT implementation for a length of non-power-of-2, by making use of a subset of the hardware/functional units of a power-of-Q FFT, is disclosed herewith. In software defined radio for example here DRM standard (Digital Radio Mondiale), by the system design it is required to perform FFTs that are of length 352, 224, 576, etc., which are not power-of-2.

Although examples of the invention have been described with reference to performing a 352-data point FFT, the concepts herein described are equally applicable to any non-power-of-2 FFT.

Although examples of the invention have been described with reference to performing a 352-data point FFT in the order of a 11-point FFT followed by a 4-point FFT and followed by an 8-point FFT, it is envisaged that any order of decomposed FFTs may be used. e.g. 4-8-11, 8-11-4, 11-4-8, 8-4-11, 4-11-8, or 11-8-4. However, from a point of view of implementation accuracy, an ascending order is desirable—i.e. 4-point FFT followed by a 8-point FFT followed by a 11-point FFT.

In aspects of the invention, the digital signal processor's functional units for FFT computation support may be adapted to employ specialized or customized instructions, to facilitate processing of non-power-of-2 FFTs, whereby when decomposed, the FFT does not support a full chain of multiple-of-2 FFTs. A customized instruction encompasses an instruction that was changed from its original operation to perform a specialized application. In order to achieve this it can make use of the hardware units of the processor in a particular way. In the context of the present invention, for a case of a processor with multiple processing units operating in parallel, customized instructions are used to help to select a subset of these multiple processing units. Also, in some examples, the customized instruction can make use of the hardware support to perform pre-processing on the fetched data prior to feeding the same to the selected processing unit(s).

In a vector DSP, the data is processed in single instruction multiple data (SIMD). Here, in general for a DRM implementation, the data fetching and data processing may be performed in, say, multiples of 4. For example, four complex numbers may be fetched in a single cycle by a 160-bit load, and can be multiplied with twiddle factors (another set of 4 complex numbers), and the result is accumulated over the required FFT length.

In this example, an efficient way is proposed to have the SIMD vector processor support a new instruction that makes the last multiplication of the total 12 multiplications of the FFT equation automatically to be zero. For this to happen, in this example of the invention, the DSP has been configured to support customized instructions that bypass a subset of its processing elements. In this context, bypassing a subset of its processing elements encompasses the ability to turn off a few processing elements or multipliers from a processor that has, say, 'Q' multipliers.

Typically, the processor will have instruction support for $\Sigma_{n=1}^{Q}(a_n*b_n)$, and advantageously with the proposed instruction the processor is able to support $\Sigma_{n=1}^{R}(a_n*b_n)$ where R<Q. Thus, in this example, the use of customized instructions for odd decomposed FFT lengths (e.g. lengths that are either an odd number (i.e. non-multiple-of-2-length) or indeed a non-multiple-of-4-length, which bypass a subset of the FFT processing elements, may avoid any need to have additional data points set to zero.

Thus, in this example of the invention, the DSP, such as DSP 302 in FIG. 3 or implemented with the example software program 402 of FIG. 4, may perform DSP instructions that fetch the data, and can make the fetched data to be zeroed out at specific data points. As previously discussed, having the proposed instruction $\Sigma_{n=1}^{R}(a_n*b_n)$ where R<Q will assist in performing the equivalent of having the equation $\Sigma_{n=1}^{Q}(a_n*b_n)$ with additional (Q-R) zeros in data points. Advantageously, this will further reduce the FFT algorithm complexity, by facilitating not having redundant data points to be physically present in memory, thereby saving on the additional memory usage. In this manner, the original 352 data points alone are sufficient to be processed using a set of DSP instructions.

Figure 5:
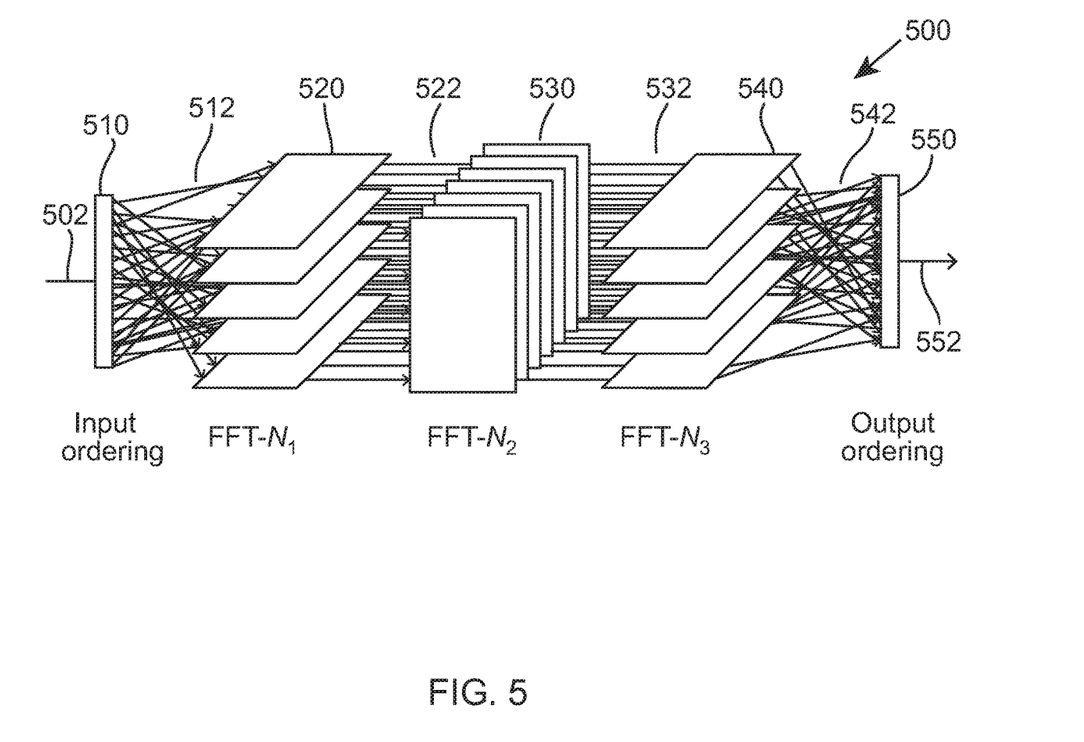
FIG. 5 illustrates an example of an operation for implementing a 352-point FFT using a PFA decomposed FFT on a DSP, according to example embodiments of the invention.

Referring now to FIG. 5, an example of an operation for implementing a 352-point FFT, using a PFA decomposed FFT on a DSP is illustrated according to example embodiments of the invention. Although, for the example 352-point FFT, three decomposed FFTs are used, the concepts herein described will equally apply to two or four or more decomposed FFTs, for use with other length FFTs. This example of a 352-point FFT algorithm recursively re-expresses a DFT of length N=N1×N2×N3, into smaller DFTs of size N1 520 and N2 530 and N3 540. The lengths of the small DFTs N1 520 and N2 530 and N3 540 have to be co-prime and can be implemented with an arbitrary algorithm. Here, two integers are said to be coprime if the only integer that divides them commonly is '1'. Also, in this context, the term 'arbitrary' encompasses any method to implement the FFT for non-power-of-two lengths. Good's mapping in [2] is used to convert N=N1×N2× . . . ×NL point DFT into a L-dimensional DFT equation and optimizes the PFA for the number of calculations to be performed. However, Good's mapping in [2] assumes that the input data 502 is ordered in Ruritanian Correspondence (RC) order by RC algorithm 510, and the output data 552 in Chinese Remainder Theorem (CRT) order by CRT algorithm 550, or vice versa.

In an example of the invention, the RC algorithm 510 performs a normal configuration of the input data. The respectively ordered input data bits of the 352-point FFT 500 are routed 512 to a first 11-point DFT 520. In this second example of the invention, the DSP performs a first 11-point DFT 520. The data fetching and data processing may be performed in multiples of 4. For example, four complex numbers may be fetched in a single cycle by a 160-bit load, and can be multiplied with twiddle factors (another set of 4 complex numbers), and the result is accumulated over the required FFT length. In this manner, the DSP reverts the FFT back to a 352-point FFT. Thereafter, the DSP takes the output 522 from the first 11-point DFT 520 and performs a second (decomposed) 4-point DFT 530. Thereafter, the DSP takes the output 532 from the second (decomposed) 4-point DFT 530 and performs a third (decomposed) 8-point DFT 540. Finally, the DSP takes the output 542 from the third (decomposed) 8-point DFT 540 and re-orders the output data using a CRT function or algorithm 550, before the re-ordered FFT data is output 552.

Figure 6:
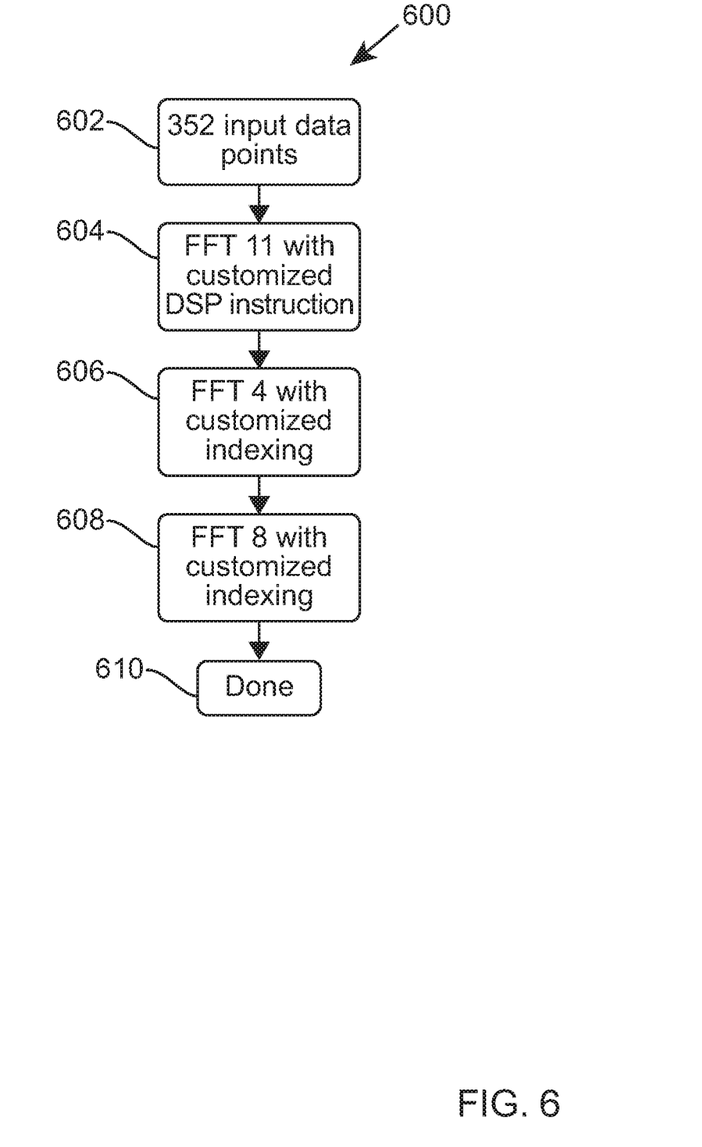
FIG. 6 illustrates an example flowchart of an operation for implementing a 352-point FFT using a PFA decomposed FFT on a DSP, according to example embodiments of the invention.

Referring now to FIG. 6, an example flowchart of an operation for implementing a 352-point FFT using a PFA decomposed FFT on a DSP, is illustrated according to example embodiments of the invention. Here, using a PFA decomposed FFT on a DSP, the FFT 352 can be decomposed into smaller FFTs, namely: FFT 11×FFT 4×FFT 8, where N11=11, N2=4, N3=8, and where the support of FFT4 and FFT8 is readily available. In accordance with example embodiments, the processor or processing elements have been adapted in order to implement the FFT11 operation, and bypass a number of subset of FFT processing functions. The flowchart 600 commences in step 602 with input data of 352 points. At a first stage in 604, 32 instances of 11-point FFT are computed, customized using DSP instructions as described above. At a second stage in 606, 88 Instances of 4-point FFT are computed, as described above. At a third stage in 608, 44 instances of 8 point FFT are also computed. The output of the third stage at 608, when re-arranged, generates the overall FFT output at 610.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed to additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. Also for example, the examples, or portions thereof, may implemented as soft or code representations of physical circuitry or of logical representations convertible into physical circuitry, such as in a hardware description language of any appropriate type. Also, the invention is not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'embedded systems'. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An embedded system comprising:
a processing circuit comprising a plurality of processing units that are operated in parallel; and
a memory, operably coupled to the processing circuit and configured to store at least input data, wherein the processing circuit is configured to:
support an implementation of a non-power-of-2 fast Fourier transform (FFT) operation using a multiplication of at least two smaller FFT operations;
employ a customized instruction configured to perform a primary FFT operation using a first FFT operation of the at least two smaller FFT operations, whereby the customized instruction writes results of the performed primary FFT operation on to the memory in multiples of less than a number of data points matching a number of the plurality of processing units, and write results of the performed primary FFT operation on to the memory by bypassing a subset of processing circuit operations; and perform a secondary FFT operation using a second FFT operation of the at least two smaller FFT operations.

2. The embedded system of claim 1, wherein the customized instruction is further configured to bypass the subset of the processing circuit operations for every data point that corresponds to a length of the non-power-of-2 FFT operation.

3. The embedded system of claim 1, wherein the customized instruction is further configured to bypass the subset of the processing circuit operations by fetching data and zeroing out the fetched data at least at data point that corresponds to a length of the non-power-of-2 FFT operation.

4. The embedded system of claim 1, wherein the customized instruction is further configured to make a last multiplication of the first FFT operation of the at least two smaller FFT operations automatically to be zero.

5. The embedded system of claim 1, wherein the customized instruction is further configured to turn-off at least a last multiplier of the plurality of processing units.

6. The embedded system of claim 1, wherein the customized instruction is further employed for use in each of the at least two smaller FFT operations.

7. The embedded system of claim 1, wherein the processing circuit is further configured to decompose a FFT 352 operation into the first FFT operation, the second FFT operation, and a third FFT operation, wherein the first FFT operation performs an 11-data point FFT operation, the second FFT operation performs a 4-data point FFT operation, and the third FFT operation performs a 8-data point FFT operation.

8. The embedded system of claim 1, wherein the implementation of the non-power-of-2 FFT operation is an implementation of a non-power-of-2 inverse fast Fourier transform (IFFT) operation.

9. The embedded system of claim 1, wherein the processing circuit is a single instruction, multiple data (SIMD) vector processor.

10. A communication unit comprising:

a processing circuit comprising a plurality of processing units that are configured to be operated in parallel; and a memory operably coupled to the processing circuit and configured to store at least input data, wherein the processing circuit is configured to:

support an implementation of a non-power-of-2 fast Fourier transform (FFT) operation using a multiplication of at least two smaller FFT operations;

employ a customized instruction configured to perform a primary FFT operation using a first FFT operation of the at least two smaller FFT operations, whereby the customized instruction writes results of the performed primary FFT operation on to the memory in multiples of less than a number of data points matching a number of the plurality of processing units and turns off at least a last multiplier of the plurality of processing units; and perform a secondary FFT operation using a second FFT operation of the at least two smaller FFT operations.

11. The communication unit of claim 10, wherein the customized instruction is further configured to write results of the performed primary FFT operation on to the memory by bypassing a subset of processing circuit operations.

12. The communication unit of claim 11, wherein the customized instruction is further configured to bypass the subset of the processing circuit operations by fetching data and zeroing out the fetched data at pre-determined data points.

13. The communication unit of claim 10, wherein the customized instruction is further configured to make a last multiplication of the first FFT operation of the at least two smaller FFT operations automatically to be zero.

14. A method for an embedded system comprising a plurality of processing units that are configured to be operated in parallel to support an implementation of a non-power-of-2 fast Fourier transform (FFT) operation, the method comprising:

receiving input data and using a multiplication of at least two smaller FFT operations;

employing a customized instruction configured to perform a primary FFT operation using a first FFT operation of the at least two smaller FFT operations;

writing results of the performed primary FFT operation on to a memory in multiples of less than a number of data points matching a number of the plurality of processing units;

writing results of the performed primary FFT operation on to the memory by bypassing a subset of processing circuit operations; and performing a secondary FFT operation using a second FFT operation of the at least two smaller FFT operations.

* * * * *